United States Patent [19]

Dries et al.

[11] 4,444,351
[45] Apr. 24, 1984

[54] METHOD OF SOLDERING METAL OXIDE VARISTORS

[75] Inventors: Paul P. Dries, Janesville; Christopher J. Kulis, Caledonia; Theodore O. Sokoly, Greenfield, all of Wis.

[73] Assignee: Electric Power Research Institute, Inc., Palo Alto, Calif.

[21] Appl. No.: 321,732

[22] Filed: Nov. 16, 1981

[51] Int. Cl.³ .............................................. B23K 1/06
[52] U.S. Cl. .................... 228/121; 228/254; 228/259; 228/262; 228/215
[58] Field of Search .............. 228/118, 121, 215, 262, 228/259, 254; 29/576 J; 357/76

[56] References Cited

U.S. PATENT DOCUMENTS

| | | |
|---|---|---|
| 3,005,257 | 10/1961 | Fox . |
| 3,103,067 | 9/1963 | Dixon . |
| 3,266,136 | 6/1966 | Gutbier . |
| 3,415,556 | 12/1968 | Dryden . |
| 3,430,332 | 3/1969 | Roczey-Koller .................. 228/262 |
| 3,477,118 | 11/1969 | Terrill . |
| 3,697,873 | 10/1972 | Mazur ............................. 324/158 D |
| 3,716,907 | 2/1973 | Anderson .......................... 29/470.9 |
| 3,733,687 | 5/1973 | Tanaka et al. ..................... 228/262 |
| 3,742,181 | 6/1973 | Costello ............................... 219/85 |
| 3,744,121 | 7/1973 | Nagano et al. ....................... 29/502 |
| 3,956,821 | 5/1976 | Martin ................................ 29/590 |
| 3,993,236 | 11/1976 | Antonevich ........................ 228/262 |

FOREIGN PATENT DOCUMENTS

| | | | |
|---|---|---|---|
| 2363172 | 6/1975 | Fed. Rep. of Germany ........ 357/76 |
| 2623778 | 12/1976 | Fed. Rep. of Germany ...... 228/262 |
| 2824606 | 12/1978 | Fed. Rep. of Germany ........ 357/76 |
| 2000749 | 1/1977 | Japan .................................. 228/262 |
| 5086680 | 6/1980 | Japan .................................. 228/262 |

Primary Examiner—Kenneth J. Ramsey
Assistant Examiner—M. Jordan
Attorney, Agent, or Firm—Flehr, Hohbach, Test, Albritton & Herbert

[57] ABSTRACT

A method is provided for electrically interconnecting a plurality of varistors of the type formed predominantly of metal oxide. Molten solder is first applied to the receiving surfaces provided on opposite sides of each of the varistors. The molten solder is then subjected to vibrations of from 5,000 to 35,000 hertz, causing the solder to strongly adhere to the receiving surfaces. The varistor bodies are then soldered to one another along their receiving surfaces to electrically interconnect the varistor bodies. In one embodiment of the method, the applying of molten solder, vibrating the molten solder, and soldering the varistor bodies to one another are all performed substantially simultaneously by means of a vibrating solder bath.

7 Claims, 6 Drawing Figures

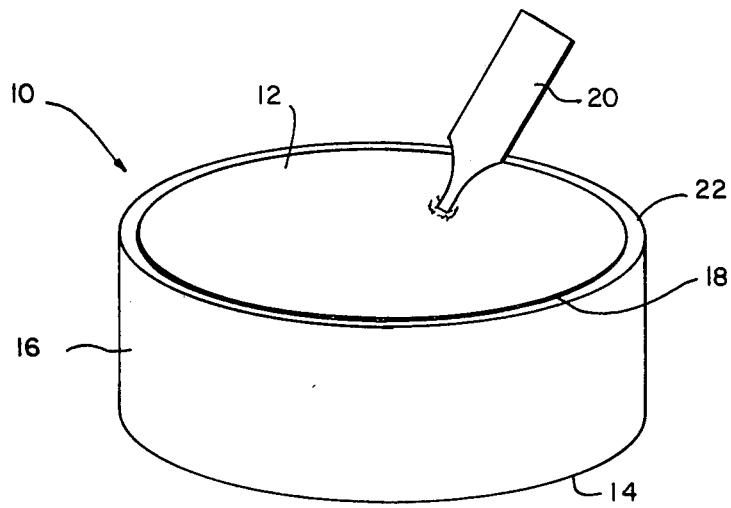
FIG.—1
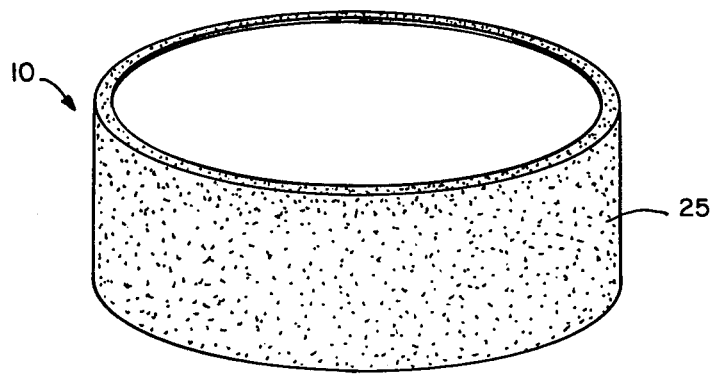
FIG.—2
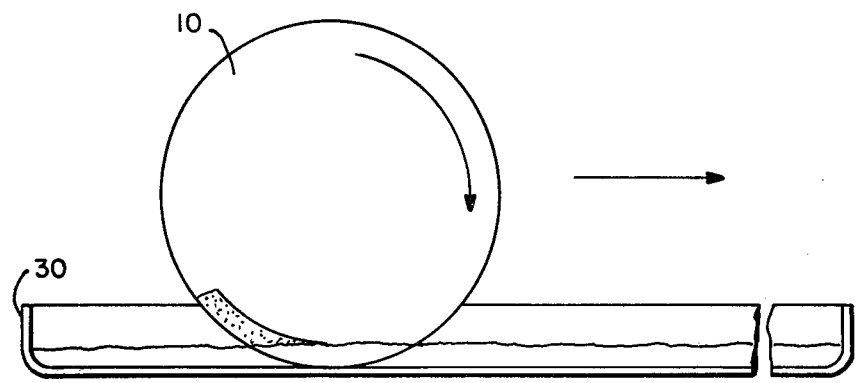
FIG.—3

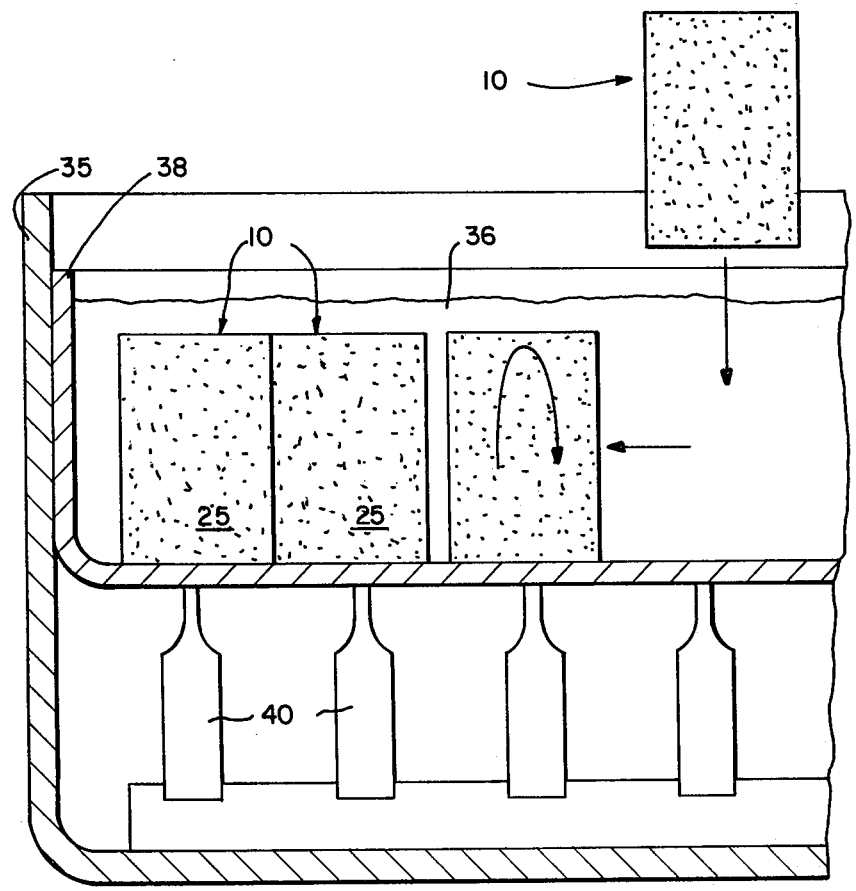
FIG.—4
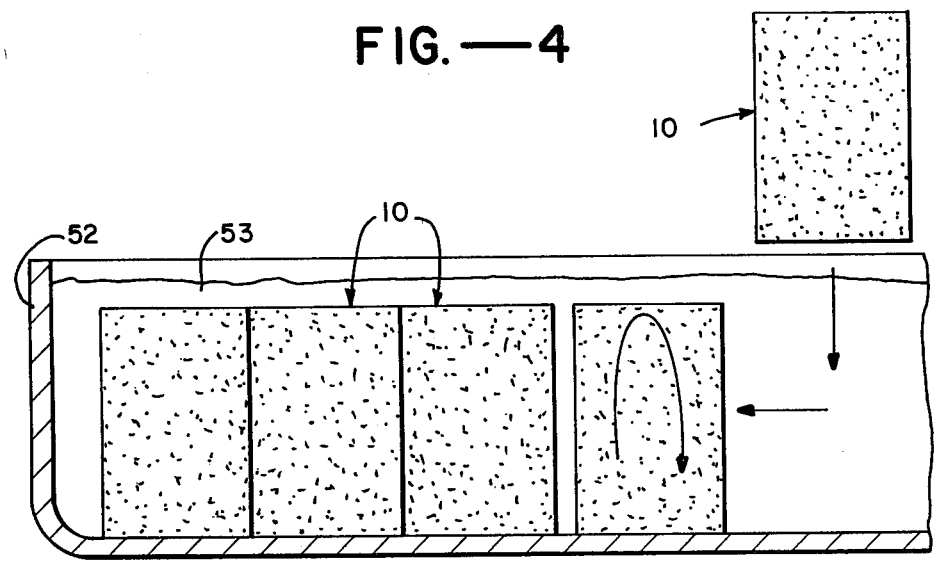
FIG.—6

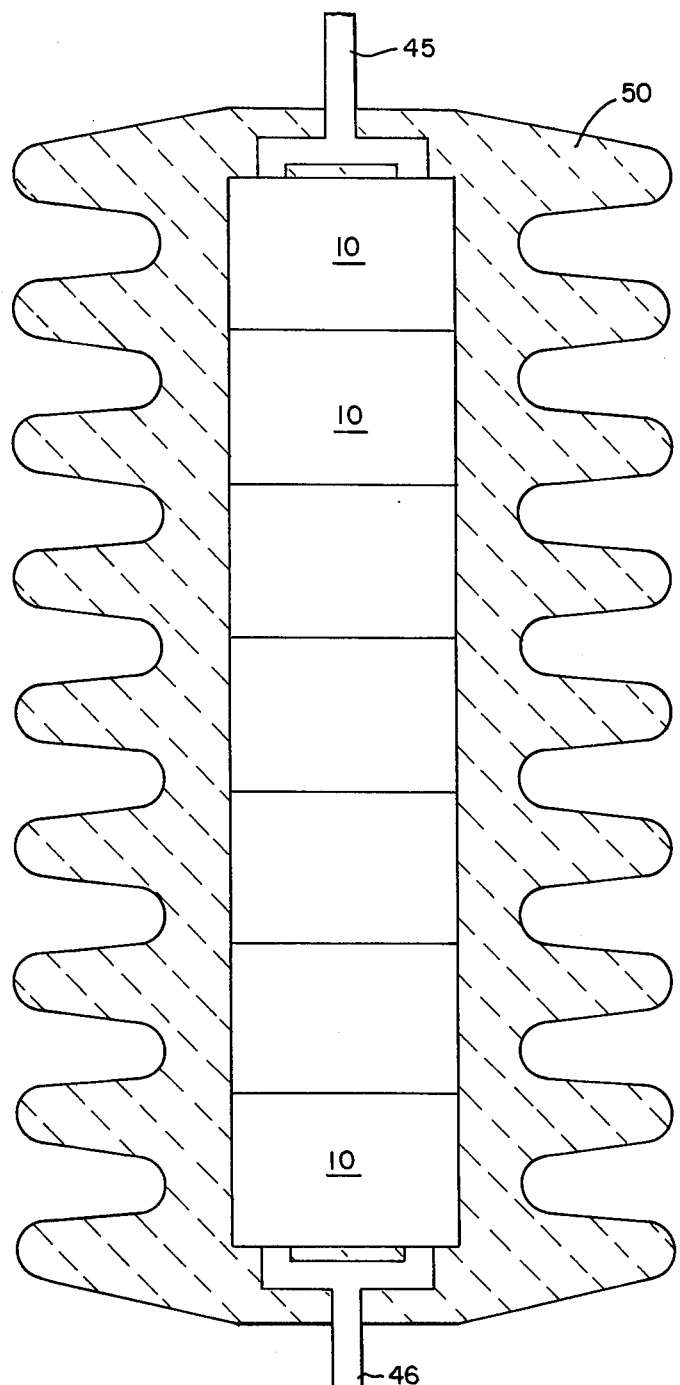
FIG.—5

METHOD OF SOLDERING METAL OXIDE VARISTORS

The invention relates generally to voltage dependent resistors formed predominantly of metal oxide commonly called varistors, and more particularly to a method and means for forming solderable connections to varistors.

An important use for varistors in the electric power industry is in overvoltage protection for power transmission and distribution lines. Generally, varistors are connected between a high voltage line and ground, and are essentially non-conducting until the voltage across the device reaches a predetermined breakover voltage level. When the breakover voltage is exceeded, the varistor begins to conduct current. The nonlinear voltage-dependent resistance characteristic of varistors provides for effective protection against overvoltages on power lines caused by lightning bolts or the like.

Varistors today are most commonly formed from a sintered mixture of metal oxide powder together with certain impurities. Quantities of the varistor material are mixed, pressed into blocks and sintered by various well known techniques such as those described in U.S. Pat. Nos. 3,928,254; 3,953,373 and 3,962,144. Because of the importance of uniformity in the varistor material if predictable performance and long life are to be achieved, varistors are generally fabricated in relatively small blocks or discs across which the external voltage is applied. For a given cross sectional area of varistor material, the breakover voltage is increased by enlarging the thickness of material through which the current must pass. In order to provide varistors with a sufficiently high breakover voltage to protect high voltage power lines, the thickness of varistor material must be very large. This is generally accomplished by assembling the varistor blocks in stacks or columns to produce a series connection.

To effectively interconnect a number of varistor blocks in series, it is necessary to provide suitable contacts on opposite sides of the individual blocks. Applying contacts to the metal oxide varistors presents a number of problems. Generally in varistors formed predominantly of zinc oxide, for example, contacts have been provided by first lapping opposed receiving surfaces with abrasives, after which a conductive material such as silver is deposited. Less expensive contacts formed of aluminum, zinc, or the like are also used, but generally must be applied by flame or plasma spraying if they are to make ohmic contact with the varistor material. Once contacts are applied, individual varistor blocks are stacked to arrive at the desired thickness of varistor material. It is generally necessary to mount the varistor stack under mechanical compression to provide effective electrical interconnection between individual varistor blocks, which greatly increases the cost of the mounting case used. Alternatively, varistors can be soldered together, although effective soldering of some contact material such as zinc and aluminum is relatively difficult.

A further problem presented by prior art techniques for assembling a number of varistors into a column is the problem of surface irregularities in individual varistor blocks. As the number of varistor blocks in a column increases, the importance of absolutely parallel contact surfaces becomes more important. The effect of non-parallel surfaces obviously increases with the height of the stack.

As the electric power industry continues to increase the voltage levels on power distribution and transmission lines, the need for improved methods and means for assembling and stacking varistor blocks into high voltage varistors correspondingly increases.

It is an object of the present invention to provide a method of electrically interconnecting a plurality of predominantly metal oxide varistor bodies to form a varistor suitable for high voltage applications.

Another object of the invention is to provide a method of applying conductive contacts to a predominantly metal oxide varistor body wherein the contacts strongly adhere to the body and are readily solderable.

Accordingly, a method of assembling a plurality of bodies into a cohesive column is provided. Each body is formed predominantly of metal oxide and has opposed receiving surfaces thereon. The method comprises the following steps: molten solder is applied to the opposed receiving surfaces of each body. The molten solder is subjected to vibrations of from 5,000 to 35,000 hertz, whereby the solder strongly adheres to the receiving surfaces of the bodies. A plurality of the bodies are then soldered to one another along the receiving surfaces to form a cohesive column of bodies upon solidification of the solder. The cohesive column of varistors can be employed in assembling varistors suitable for high voltage applications.

A preferred embodiment of the invention is described in detail below with reference being made to the accompanying drawings in which:

FIG. 1 is a perspective view of a single varistor body illustrating a method of applying a conductive contact according to the present invention.

FIG. 2 is a perspective view of a single varistor body in which a portion of the surface has been masked.

FIG. 3 illustrates the step of applying a mask for preventing adherence of solder to portions of the surfaces of a varistor body, including a cross sectional view of a holding pan for masking material.

FIG. 4 is a cross sectional view of a soldering trough which includes vibratory means used for assembling a number of varistor bodies into a cohesive column.

FIG. 5 is a side view in partial cross section of a varistor assembled for high voltage applications in accordance with the present invention.

FIG. 6 is a partial cross sectional view of a soldering trough illustrating an alternative method of assembling a number of varistor bodies into a cohesive column in accordance with the present invention.

Referring to FIG. 1, varistors assembled by the method of the present invention are formed of a plurality of varistor bodies 10. The varistor bodies are substantially disk shaped, having generally parallel opposed receiving surfaces 12 and 14 on the upper and lower surfaces, respectively. An intermediate surface 16 extends around the sides of the disk.

The varistor bodies used with the present invention are fabricated in any conventional manner. The bodies are generally a compressed and sintered mixture of compounds, with the principal ingredient being metal oxide. In the description below, a representative composition for body 10 will be used, having as its primary ingredient zinc oxide. A representative composition for the mixture from which the varistor body is made is as follows:

Approximately 90 molar percent ZnO (zinc oxide)

Approximately 5 molar percent $Bi_2O_3$ (bismuth trioxide)
Approximately 0.5 molar percent NiO (nickel oxide)
Approximately 0.5 molar percent $Co_3O_4$ (cobalt tetraoxide)
And additional impurities forming the remainder of the composition which might include, for example:
$MnO_2$ (manganese oxide)
$Sb_2O_3$ (antimony oxide)
$TiO_2$ (titanium oxide)
BaO (barium oxide)
$B_2O'$ (boron oxide)
SiC (silicon carbide)
$SnO_2$ (tin oxide)
And numerous other compounds added to the mixture to attain certain desired properties. Representative examples of mixtures are used to form varistor bodies are described in U.S. Pat. Nos. 3,928,245; 3,962,144; 3,953,373 and 4,003,855.

Fabrications of a varistor body from the above mixture is accomplished in the manner well known in the art of varistor manufacturing. In general, the mixture is first pressed into a disc shape and then sintered in air at temperatures of approximately 1,000° C. or above for a predetermined period of time, generally amounting to several hours. The resultant varistor body is a relatively dense mass of material having a voltage dependent electrical resistance. As was noted in the discussion above, it is generally necessary to stack a number of the varistor bodies together to arrive at a reasonable breakdown voltage for high voltage applications. Accordingly, it becomes necessary to provide some method and means for stacking and electrically interconnecting a plurality of varistor bodies.

To permit interconnection with adjacent varistor bodies, each of several varistor bodies are provided with conductive contacts on receiving surfaces 12 and 14. In accordance with the method of the present invention, contacts formed of solder are applied directly to surfaces 12 and 14. The basic method, illustrated in FIG. 1, includes the initial step of applying molten solder to receiving surfaces 12 and 14 which have been preheated. The molten solder is then subjected to vibrations. The frequency at which the molten solder is vibrated is preferably in a range from 5,000 to 35,000 hertz. A conventional vibratory horn 20, often referred to as a ultrasonic vibrator can be used to supply vibratory energy. It has been found that subjecting the molten solder to vibration signficiantly increases the adherence of certain types of solder to metal oxide varistors. Once the molten solder has been subjected to vibrations, a number of varistor bodies can be soldered to one another on their receiving surfaces to form a cohesive column of bodies when the solder solidifies, as described more fully below.

For metal oxide varistors formed predominantly of zinc oxide together with other impurities, it has been found that solder having a composition of 95% zinc and 5% aluminum works the best. Solder having a 100% zinc composition also is satisfactory, although it tends to oxidize more rapidly, requires higher soldering temperatures and has lower mechanical strength. For the preferred 95% zinc and 5% aluminum solder, the solder should be applied at a temperature of approximately 400° C.

The steps of applying molten solder and subjecting the molten solder to vibrations can be performed on each varistor body individually, in the manner illustrated generally in FIG. 1. The receiving surfaces 12 and 14 of the varistor body can be heated by a suitable means to above the melting point of the solder. The molten solder is then applied to the receiving surfaces, and the vibratory probe 20 is used to vibrate the molten solder to bond the solder to the varistor body. The solder can then be allowed to cool, forming a solderable contact, or a number of blocks can be stacked together while the solder remains molten. In this latter case, the solder is allowed to cool, thereby mechanically and electrically interconnecting the blocks together.

As shown in FIG. 1, solder 18 is applied to the central portion of each receiving surface, with an edge portion 22 preferably being left unsoldered although portion 22 can be soldered without departing from the present invention. In any event, the side 16 of the varistor body is unsoldered. As will be readily appreciated, it is important that conductive paths down the sidewalls 16 of the varistor bodies must be avoided for the assembled stack of varistors to perform as a voltage-dependent resistor. The margins (portions 22) of the receiving surfaces may be kept free of solder as an additional precaution against flashover between the opposed receiving surfaces.

Although it would be theoretically possible to apply solder to just the central portion of each receiving surface of a varistor body, leaving the margins and sidewalls free of solder, in practice, a mask is used. FIG. 2 illustrates a preliminary step in the preferred method in which the intermediate surface formed by sidewalls 16 and the edge portions 22 of receiving surfaces 12 and 14 are masked by a solder inhibitor which prevent adherence of solder to the varistor material. A suitable mask material for this purpose is a clay and water slurry which is applied wet to the surface of the varistor body. After the clay and water slurry dries, a high temperature paint is applied to the masked portion as an additional precaution. After masking the molten solder is applied in the manner shown in FIG. 1, and the mask 25 may be removed at a convenient point in the fabrication process, for example, by means of washing with water or a suitable solvent in the case of the clay slurry. The glass-clay coating is preferably left in place as an anti-flashover collar.

The above method of applying contacts to varistor bodies has several advantages over prior art techniques. Vibration of the molten solder has been found to substantially improve the adhesion of the solder to the varistor body over the adhesion resulting from applying solder alone. The resulting contacts being solder themselves, are by definition solderable and thus allow for the series connection of a number of the varistor bodies. Solder applied in accordance with the present invention will adhere to the varistor body without special surface preparation such as grinding, polishing or other lapping techniques. Contacts are applied more easily than with relatively expensive flame or plasma spray processes and result in better electrical contact between the conductive metal and the varistor body.

The method of the present invention is particularly well adapted to the assembly of a plurality of metal oxide varistor bodies into a cohesive column for high voltage applications. FIGS. 3-5 illustrate how the present invention is applied to a method of assembling a plurality of varistor bodies into a cohesive column which is used to fabricate a high voltage varistor.

FIG. 3 shows a suitable technique for applying the solder inhibiting mask 25 to varistor body 10. A shallow pan 30 is filled to a depth equal to the width of the edge portion 22 which will be left free of solder with the clay and water slurry used to make mask 25. Varistor bodies 10 are simply rolled one complete revolution in pan 30 and removed to allow the mask to dry. High temperature paint can then be applied, producing masked varistor bodies.

The preferred method of assembling a plurality of masked varistor bodies is illustrated in FIG. 4. In this method a vibrating solder bath 35 is used. Such vibrating solder baths are conventional devices which maintain solder 35 in a molten state within a pan 38 by heating. The pan is supported on a plurality of vibratory horns 40 which continuously vibrate the molten solder at any desired frequency. In accordance with the method of the present invention, the vibratory horns 40 should be set to vibrate at from 5,000 to 35,000 hertz. The vibratory bath 35 effectively vibrates all the molten solder contained therein at the frequency desired. To assemble a column of varistors masked varistor bodies to which no molten solder has been applied are immersed in the vibrating solder 36 in side-by-side relation, with their receiving surfaces facing one another. The bodies are preferably rotated slightly against one another to ensure a complete and even solder connection. The vibration of the solder causes the solder to strongly adhere to the receiving surfaces 12 and 14. In addition, the molten solder when cooled will bond together adjacent varistor bodies, effectively. In this latter regard, after the varistor bodies are immersed into the bath of solder and subjected to the vibrating molten solder, they are held in side-by-side relationship by suitable clamping means (not shown) and removed from the bath. Thereafter, the solder between varistor bodies are allowed to cool, thereby mechanically and electrically interconnecting the bodies.

Following the soldering step in the vibratory solder bath, the column of varistors is removed and the solder allowed to solidify. The mask is then removed by washing with water or a suitable solvent. Referring to FIG. 5, a plurality of varistor bodies 10 are shown in a cohesive column, with the varistor bodies soldered together along their receiving surfaces. What remains is a cohesive electrically interconnected column of varistor material which is well suited to high voltage varistor applications. Because the column of varistors is both electrically interconnected and cohesive, it is unnecessary to mount the column under compression. Accordingly, it is possible to encase the varistors in relatively convenient moldable materials such as a POLYSIL ® (EPRI trademark) housing, or directly in a Gas Insultated Substation (GIS) without any additional housing support.

FIG. 5 illustrates a completed varistor assembled in accordance with the method of the present invention. Contacts 45 and 46 are electrically connected to the ends of the column which, like each varistor in the column, will have solderable contacts on the receiving surfaces. As such, attachment of the contacts is readily effected by soldering. The entire column and contacts can then be encased in POLYSIL ® housing 50 or operated in a suitable environment such as a GIS without any housing.

The present invention produces high voltage varistors far more economically than prior art techniques. Because the varistors are soldered directly to one another, slight irregularities in the receiving surfaces are not a problem. Solder simply fills the voids between the receiving surfaces. Furthermore, a straight stack can be formed even if the receiving surfaces are not precisely parallel. The cohesive column of varistors provides better heat transfer than compression mounted varistors. Finally, it is possible to encapsulate the column of varistors because the encapsulating material will not penetrate between the individual varistor blocks.

It is alternatively possible to assemble a cohesive column of varistor bodies by the present method without the use of a vibratory solder bath such as the one shown in FIG. 4. By this method, solder contacts are applied to the receiving surfaces of the varistor bodies before immersing the bodies in the solder bath. Application of the solder contacts is accomplished as shown in FIG. 1. Molten solder is applied to the receiving surfaces, preferably after a mask 25 is applied, and the molten solder is subjected to vibrations of from 5,000 to 35,000 hertz. The solder is then allowed to solidify on the varistor bodies, producing what amounts to solder contacts on the varistor bodies. The varistor bodies are then immersed and assembled in a nonvibratory solder bath such as a solder bath 52 shown in FIG. 6. As with the vibratory solder bath, solder bath 52 maintains solder 53 therein in a molten state by heating. The masked varistor bodies on which solder contacts have been provided are then immersed in the solder bath and assembled together into a column. As before, it is preferable to rotate adjacent varistor bodies with respect to one another to ensure complete contact. Because the solder already applied to the varistor bodies has been vibrated and strongly adheres thereto, the solder from the solder bath simply serves to liquify and bond together the adjacent solder contacts and the varistor bodies into a cohesive column. Once assembled, the column is removed and the solder allowed to solidify. Finally, the masking layer is removed and the column of varistors encapsulated as shown in FIG. 5 or otherwise mounted for use as a high voltage varistor.

The method of assembling and electrically interconnecting varistor bodies according to the present invention offers excellent mechanical bonding and improved heat conduction over prior art methods. Furthermore, the need for expensive grinding and lapping operations and absolutely parallel surfaces on the varistor bodies has been eliminated, significantly reducing the expense of high voltage varistors. In addition, it is possible to use molded housings such as epoxy or POLYSIL ® material or to completely eliminate the need for a separate housing in applications such as Gas Insulated Substations.

The present invention provides a method of electrically interconnecting a plurality of predominantly metal oxide varistor bodies to form a varistor suitable for high voltage applications. The invention also provides a method of applying conductive contact to a predominantly metal oxide varistor body wherein the contacts strongly adhere to the body and are readily solderable.

What is claimed is:

1. A method of electrically interconnecting a plurality of varistor bodies formed predominantly of metal oxide, comprising the steps of: applying molten solder to receiving surfaces provided on opposite sides of each said varistor body, subjecting said applied molten solder to vibrations of from 5,000 to 35,000 hertz whereby the solder strongly adheres to the receiving surfaces, and soldering a plurality of said varistor bodies to one another along their respective receiving surfaces to electrically interconnect said varistor bodies, said varistor bodies each having a pair of receiving surfaces on opposite sides thereof and an intermediate surface area extending between said receiving surfaces, said method including a preliminary masking step in which said intermediate surface of each said varistor body is masked to prevent solder from adhering to said intermediate surface area during subsequent steps in said method, said masking step including coating said intermediate surface area of each of said varistor body with solder inhibitor means for preventing adherence of solder to said varistor body thereby producing a masked varistor body, the subsequent steps in said method serving to electrically interconnect a plurality of said masked varistor bodies.

2. A method as in claim 1 including the steps of allowing the solder to solidify after being subjected to vibrations of from 5,000 to 35,000 hertz to create a solder contact on each said receiving surface, and then soldering together the solder contacts of adjacent varistor bodies to accomplish the step of soldering a plurality of said varistor bodies to one another.

3. A method as in claim 1 in which all said steps in the method of electrically interconnecting a plurality of varistor bodies are performed substantially simultaneously.

4. A method as in claim 1 in which said step of soldering a plurality of said varistor bodies to one another includes immersing a plurality of said masked varistor bodies in a solder bath of molten solder, positioning said masked varistor bodies side-by-side with said receiving surfaces facing one another to form a column in said solder bath, and then removing said column of masked varistor bodies from said solder bath to permit solidification of the solder.

5. A method as in claim 1 in which the steps following said masking step include immersing a plurality of said masked varistor bodies in a vibrating solder bath which vibrates molten solder contained therein at frequencies of from 5,000 to 35,000 hertz, positioning said masked varistor bodies side-by-side with said receiving surfaces facing one another, to form a column in said vibrating solder bath, and then removing said column of bodies from said vibrating solder bath to permit solidification of the solder.

6. A method as in claim 1 in which said masking step further includes coating edge portions of each said receiving surface of said varistor bodies with solder inhibitor means for preventing adherence of solder to said varistor bodies such that said masked varistor bodies include surface areas which are unmasked only on a central portion of each said receiving surface.

7. A method as in claim 1 including the step of removing said solder inhibitor means from the electrically interconnected varistor bodies after said step of soldering a plurality of said varistor bodies to one another has been accomplished.

* * * * *